United States Patent [19]

Stearns et al.

[11] 3,903,252

[45] Sept. 2, 1975

[54] DENTAL DISCLOSING COMPOSITIONS AND THE METHOD OF MAKING AND USING THE SAME

[75] Inventors: Robert I. Stearns; Sandra K. Stearns, both of St. Louis, Mo.

[73] Assignee: The Lorvic Corporation, St. Louis, Mo.

[22] Filed: June 8, 1972

[21] Appl. No.: 260,980

[52] U.S. Cl. .................... 424/7; 424/49; 424/78; 424/362
[51] Int. Cl.² .................. A61K 7/16; A61K 9/06; A61K 29/00; G01N 21/04
[58] Field of Search .................. 424/7, 49, 362, 363

[56] References Cited
UNITED STATES PATENTS

| 2,151,495 | 3/1939 | Bender | 424/7 |
|---|---|---|---|
| 2,839,448 | 7/1958 | Hager | 424/49 |
| 3,137,632 | 6/1964 | Schiraldi | 424/49 |
| 3,279,068 | 10/1966 | Stark | 424/7 |
| 3,309,274 | 3/1967 | Brilliant | 424/7 |
| 3,584,112 | 6/1971 | Morris | 424/7 |
| 3,723,613 | 3/1973 | Block | 424/7 |

FOREIGN PATENTS OR APPLICATIONS

| 423,858 | 2/1935 | United Kingdom | 424/7 |

OTHER PUBLICATIONS

Davidson, Water–Soluble Resins, Reinhold Pub. Co. N.Y. 2nd Ed. 1968 pp. 63, 66, 67, 72–77, 91–97, 107, 108.
Harry, The Principles & Practice of Mod. Cos., Chem. Pub. Co., N.Y., Vol. I, 1962, pp. 262–266, 268–273.
deNavarre, Chem & Mfg. of Cos, Summaries of the Application Properties of Certified Dyes, Table 88, 3 pages, D. Van Nostrand Co., N.Y. 1941.
DeNavarre, The Chem. & Manuf. of Cos., D. Van Nostrand Co., N.Y. 1941, pp. 38–43, 290–293, 506–509, 514, 694–695.
Davidson, Water–Soluble Resins, Reinhold Pub., N.Y. 2nd Ed. 1962, pp. 52–54, 61, 62.

*Primary Examiner*—Albert T. Meyers
*Assistant Examiner*—A. P. Fagelson
*Attorney, Agent, or Firm*—Robert J. Schaap

[57] ABSTRACT

A dental disclosing composition in gel form for topical application in the oral cavity to permit detection of plaque formation which is not otherwise visually observable. The composition comprises a staining agent such as an organic dye or other coloring agent which selectively stains plaque formed on the teeth or restorations in the oral cavity to render the plaque visually distinguishable and prominent from the enamel and the remaining portions of the oral cavity. The composition also includes a gelling agent to provide a viscosity which is sufficient to prevent free flowing movement and resultant indiscriminate staining of other parts of the oral cavity. Other ingredients such as flavoring agents, sweeteners and preservatives are also incorporated into the composition.

9 Claims, No Drawings

3,903,252

DENTAL DISCLOSING COMPOSITIONS AND THE METHOD OF MAKING AND USING THE SAME

BACKGROUND OF THE INVENTION

This invention relates in general to certain new and useful improvements in disclosing compositions, and more particularly, to plaque disclosing compositions in gel form for topical application in the oral cavity.

The dental profession and others interested in oral hygene have recently given increased attention to the formation of plaque, including microcosms, tartar, materia alba and the like, on teeth and restorations in the oral cavity. The plaque is primarily composed of bacteria together with an interbacterial matrix consisting of salivary carbohydrates and proteins, bacterial extracellular products in the form of the polysaccharides, remnants of lysed bacteria, leukocytes and macrophages. Plaque formation may occur both subgingivally and supragingivally in the human oral cavity and most commonly formation will occur at the interproximal and gingival third areas of the teeth and furthermore, it is distributed similarly in both the upper and lower arches.

Recent evidence has shown that this plaque has a great destructive potential and under varying conditions can cause gingivitis and periodontitis, produce dental caries or form into calculus. It has also been established that plaque accumulation which is allowed to develop without removal in many cases may cause gingivitis within ten to twenty-one days. There is also recent evidence indicating that the presence of plaque with all of its components may also be capable of producing an allergic response in adjacent soft tissues.

This rather substantial potential destructiveness has given rise to the increased attention and the resultant more recent attempts to educate the public in its control. Generally, this control has adopted an approach of oral lavage and focused on the performance of tasks such as brushing, stimulating, messaging, rinsing, spraying and the like. However, while these techniques are effective for the removal of food debris and similar foreign matter, they are not very effective for removal of plaque. Plaque formation is transparent and therefore not readily visible, particularly to one who is not skilled in its detection, and most often its removal occurs mainly by accident during oral lavage.

In order to increase the effectiveness of plaque detection and removal there has been a recent introduction into the marketplace of staining compositions or so-called "disclosing" compositions. These disclosing compositions contain coloring agents or dyes which are designed to be absorbable by the plaque to make the plaque visually distinguishable from the remainder of the oral cavity. The active staining ingredient in most of these commercially available disclosing compositions is generally iodine or several organic dyes which serve as the primary diagnostic agent.

The presently available disclosing compositions are generally available in either liquid solution form or in wafer form. However, these commercially available disclosing compositions have not met with a wide degreee of success and therefore, have not been universally adopted for a variety of reasons. When the disclosing composition is prepared in either tablet or wafer form, they must be chewed for release of the dye or other coloring agent. In many cases, the grit from the wafer or tablet will accumulate in the crevices in the oral cavity and are often difficult to remove. Liquid solution forms as well as tablet and wafer forms of the disclosing compositions are also highly objectionable since the coloring ingredient is not selectively absorbable by the plaque formation. Therefore, the dye or other coloring agent present in the liquid solution or in the tablet or wafer will stain the tongue and lips and other parts of the oral cavity, thereby rendering detection of the plaque difficult, if not impossible. These stains are also highly objectionable in that they are difficult to remove. In addition, extreme care must be taken when using the liquid solution forms of the known disclosing compositions since inadvertent spillage will result in permanent or semi-permanent stains on clothing or other articles.

Organic dyes have almost been universally adopted for use in the commercially available disclosing compositions due to their higher degree of effectiveness. However, in almost all cases these dyes have a highly unpalatable and objectionable taste which is not effectively masked by any known flavoring agent or sweetener. These known disclosing compositions are also objectionable since the dyes incorporated therein are often slow to dissolve. Accordingly, the composition must remain in the oral cavity for a longer period of time, thereby further aggravating the problem of the unpalatable taste.

In order to obviate the need of disclosing solutions as a diagnostic device, there has been a recent introduction in the marketplace of fluorescent light detection systems. These types of light detection systems rely upon compositions which are introducable in the oral cavity and contain an ingredient which fluoresces when activated by a proper light source. It is contended that the fluorescent ingredient or dye is absorbable by the plaque and that the fluorescent dye will only fluoresce on the areas containing plaque formation when excited by this proper light source. However, in most cases the dye fluoresces at the same color as the enamel and therefore, the plaque formation is not readily distinguishable. Furthermore, the puchase cost for these systems and the difficulty encountered in using these systems generally have militated against their widespread use.

The present invention obviates these and other problems by providing disclosing compositions in gel form containing a dye which is quickly and selectively absorbable by plaque formation in the oral cavity. This relatively quick selective absorbtion by the plaque eliminates the otherwise long time period necessary for contact of the composition with dentin or restorations and also eliminates the undesirable staining of other portions of the oral cavity. The dyes used in the subject disclosing compositions are compatible with selected taste masking agents and sweetners and the taste of these dyes are effectively masked by these agents and sweeteners to thereby overcome the problems of unpalatable taste. In addition, the composition also contains a gelling agent which provides a viscosity sufficient to overcome those problems attendant with liquid solution forms or other forms of disclosing compositions.

It is, therefore, the primary object of the present invention to provide plaque disclosing compositions for topical application in the oral cavity which contain a dye selectively absorbable by plaque formation and which does not appreciably stain other portions of the oral cavity.

It is another object of the present invention to provide plaque disclosing compositions of the type stated which are sufficiently water soluble to be readily rinsed out of the oral cavity with normal tap water or other rinsing agents without affecting the stain applied to the plaque formation.

It is a further object of the present invention to provide plaque disclosing compositions of the type stated in gel form and having the desired viscosity characteristics which permit effective handling and topical application to the teeth and restorations which also eliminates the undesirable relatively free flow of the type present with liquid solutions.

It is an additional object of the present invention to provide plaque disclosing compositions of the type stated which inherently contain the necessary viscosity to permit selective placement of the compositions for selective staining in the oral cavity.

It is also an object of the present invention to provide a method of making plaque disclosing compositions of the type stated which can be mass produced efficiently and inexpensively.

It is another salient object of the present invention to provide a method of selectively staining plaque formation in an oral cavity without undesirably staining other portions of the oral cavity through the use of plaque disclosing compositions of the type stated.

Other objects and advantages of the present invention will be apparent to those skilled in the art upon review of the following disclosure, and the invention accordingly includes the novel compositions, the method of making the compositions and the method of using the compositions hereinafter described.

GENERAL DESCRIPTION

Generally speaking, the present invention relates to plaque disclosing compositions in gel form for topical application to the teeth and restorations in an oral cavity as a diagnostic means to render the plaque visible to the naked eye, and to the method of making and using the disclosing compositions. The compositions of the present invention include pharmacologically innocuous dyes which have a high affinity for absorbtion by the plaque and which will selectively stain plaque formation without unduly staining the remaining portions of the oral cavity. Furthermore, the dye component is properly selected and is used in the subject composition in proper amounts to render the dye substantially less water soluble after absorbtion by the plaque. Thus, the composition may be rinsed from the oral cavity after application without removal of the portion of the dye which has been absorbed by the plaque.

It has been found in connection with the present invention that one particular organic dye which is a disodium salt of 9-o-carboxyphenyl-6-hydroxy-2,4,5,7-tetraiodo-3-isoxanthone is highly effective as a staining agent in the subject disclosing compositions, and which will meet all of the selective qualities mentioned above. However, it is also possible to use other dyes which are all sodium salts of phenyl substituted Δ-cyclohexadienimine and which are also effective for use in the subject disclosing compositions. Any of the aforementioned dyes would be present in non-toxic amounts but yet present at least in an amount sufficient to permit selective staining of the plaque in the oral cavity.

The subject disclosing compositions also include a pharmacologically innocuous thickening agent such as a gelling agent present in non-toxic amounts, but in an amount at least sufficient to impart a desired viscosity range to the composition. The viscosity of the composition is such that the composition is sufficiently thick so that complete free flow does not occur as in the case of a liquid solution, but which is nevertheless sufficiently non-viscous to permit topical application in the oral cavity. Typically, the compositions will have a viscosity within the range of between approximately 25,000 centipoises and approximately 150,000 centipoises and preferably within the range between approximately 80,000 centipoises and approximately 150,000 centipoises, as determined by the falling ball method, which is to be hereinafter described in more detail. In addition, the gelling agents selected for use in the disclosing compositions will be compatible with the dye and these gelling agents will also be stable within a pH range of approximately 6.0 to approximately 8.0.

The subject disclosing compositions will also include a pharmacologically innocuous flavoring agent which is present in non-toxic amounts but which is nevertheless present in an amount sufficient to effectively mask substantial portions of the unpalatable taste normally present with the dye. In addition, any of a number of known sweeteners may be incorporated into the compositions in non-toxic amounts to provide a desirably sweet taste. Furthermore, a preservative or preservative combination is added to the composition in non-toxic amounts but in an amount sufficient to prevent color deterioration of the dye. The sweeteners, flavoring agents, and preservatives are also selected so that they are compatible with the dyes and other components used in the disclosing compositions.

The compositions of the present invention are made by dissolving the selected amount of the dye, the flavoring agent, the sweetener and the preservatives in a desired amount of relatively soft water, preferably heated water, and mixed until all of the components are dissolved. Thereafter, the gelling agent is added in an amount sufficient to produce the desired viscosity by slowly adding the gelling agent to the liquid mixture with constant mixing until all of the gelling agent is dissolved.

The disclosing compositions of the present invention are effectively used by topically applying the same to the teeth and restorations in the oral cavity, permitting selective absorbtion by any plaque contained in the oral cavity. Thereafter, the excess amounts of the disclosing composition may be rinsed from the oral cavity by normal tap water or other rinsing solution. The dye which has been absorbed by the plaque will remain dissolved therein during the initial rinsing process, and will render the plaque readily visible to the naked eye.

DETAILED DESCRIPTION

More particularly, a major facet of the present invention resides in the discovery that plaque disclosing compositions can be made in gel form for topical application to the teeth and restorations in an oral cavity and containing a dye which is selectively absorbable by the plaque without undue staining of the remaining portions of the oral cavity. The dye selected for use in the compositions of the present invention is preferably a disodium salt of 9-o-carboxyphenyl-6-hydroxy-2,4,5,7-tetraiodo-3-isoxanthone, which has the following structural formula:

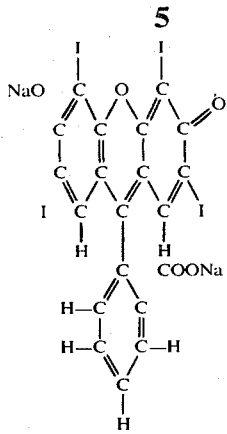

This dye is commercially available and chemically known as "erythrosine" and is often commercially known as "FD&C Red No. 3". It has been found that this dye is highly effective in the subject disclosing compositions in that it can be incorporated in a viscous solution and still remain relatively free for absorbtion by plaque formation in the oral cavity. This form of dye is also selectively absorbable by the plaque formation upon release from the gel and therefore will not materially stain other parts of the oral cavity. In addition, this dye is also highly effective in that the normally unpalatable taste can be effectively masked by certain selected taste masking agents and sweetners which are also compatible with this dye.

The subject disclosing compositions are prepared with a viscosity which is sufficiently thick so that when the composition is applied to the teeth or restorations in the oral cavity, the composition will not flow to other portions of the oral cavity and the dye which is contained therein will be readily absorbed by any plaque formation. Furthermore, the composition is prepared so that it can be readily issued from the oral cavity without redissolving the dye which has been absorbed by the plaque. When the excess amount of the composition is rinsed from the oral cavity, the dye becomes highly diluted in the water or other rinsing solution and therefore this excess dye will not stain the remaining portions of the oral cavity which it contacts. The exact nature of the dye absorbtion process is not known since the exact chemical and biochemical nature of the plaque is not fully understood. However, it is believed that the dye is perferentially absorbed partially through a physical phenomena in part due to the relatively rough surface configuration of the plaque. To this extent, the dye is physically retained on the surface of the plaque. It is also believed, however, that some of the dye absorption results in part from chemical interaction between the dye and the plaque. However, all of the dyes selected for use in the compositions and the amounts thereof are formulated so that the dyes are preferentially absorbed by the plaque without redisolution in rinse water.

Other dyes which have been found to be effective and useful in the compositions of the present invention are sodium salts of various phenyl substituted 4-(N-ethyl-p-sulfobenzylamino)-$\Delta$-cyclohexadienimine.

These dyes would include the disodium salt of 4-{[4-(N-ethyl-p-sulfobenzylamino) - phenyl] - (2-sulfoniumphenyl) - methylene } - [1-(N-ethyl-N-p-sulfobenzyl) - $\Delta^{2,5}$-cyclohexadienimine] and which is often commercially known as FD&C Blue No. 1; the monosodium salt of 4-{[4-(N-ethyl-p-sulfobenzylamino)-phenyl] - [4-(N-ethyl-p-sulfoniumbenzylamino) - phenyl] - methylene }- (N,N-dimethyl -$\Delta^{2,5}$-cyclohexadienimine) and which is often commercially known as FD&C Violet No. 1; the monosodium salt of 4-[4-(N-ethyl-p-sulfobenzylamino)-diphenylmethylene] - [1-(N-ethyl-N-p-sulfoniumbenzyl) - $\Delta^{2,5}$-cyclohexadienimine] and which is often commercially known as FD&C Green No. 1; the disodium salt of 4-{[4-(N-ethyl-p-sulfobenzylamino) - phenyl] - (4-sulfonium-phenyl)-methylene- } [1-(N-ethyl-N-p-sulfobenzyl) - $\Delta^{2,5}$-cyclohexadienimine] and which is often commercially known as FD&C Green No. 2; and the disodium salt of 4- [4-(N-ethyl-p-sulfobenzylamino)-phenyl] - (4-hydroxy-2-sulfoniumphenyl)-methylene -[1-(N-ethyl-N-p-sulfobenzyl) - $\Delta^{2,5}$-cyclohexadienimine] and which is often commercially known as FD&C Green No. 3.

Each of the aforementioned dyes can also be used in a relatively viscous disclosing composition and the dye will still remain relatively free for absorbtion by the plaque formation in the oral cavity and will be selectively absorbable by the plaque formation upon release from the gel form of the composition. Furthermore, these dyes are also effective in that the unpalatable taste normally associated with these dyes can be masked by certain selected taste masking agents and sweeteners which are compatible with these dyes. Any of these aforementioned dyes which are to be used in the disclosing compositions of the present invention are pharmacologically innocuous. Furthermore, the dyes are present in non-toxic amounts, but are nevertheless present in amounts which permit the desired staining activity.

The expression "pharmacologically innocuous" used herein is the recognized equivalent for the expression "therapeutically acceptable" often used to designate a substance which is physiologically and pharmacologically innocuous when taken in a dosage and in a regimen (i.e. frequency of administration) that is effective for its intended useful application, and thus pharmacologically harmless. The term "non-toxic amount" used herein is used to designate the amount of a component present in a range which is operative and effective for its intended purpose but which is not toxic to the user in the amounts present.

These dyes normally have a taste which are quite unpalatable to the average human being. Accordingly, pharmacologically innocuous sweeteners and taste masking agents are included in the disclosing compositions to effectively mask the undesirable taste attributable to the dyes. The taste masking or so-called "flavoring" agents and sweetners are added in non-toxic amounts, but are nevertheless present in an amount to effectively mask the taste of the dye and to provide a desirably sweet taste to the composition.

Some of the taste masking agents which can be used in the compositions of the present invention and which are compatible with the dyes for masking the taste thereof are papermint, clove extracts, clove oil, as well as a number of other commercially available taste masking agents. The sweeteners which are normally used in the compositions are generally saccharin, sucrose or other known and commercially available sugars. These taste masking agents and sweeteners must be selected so that they are in compliance with the various health requirements and similar governmental requirements for use in medicaments of this type. These taste masking agents and sweetners are by their very nature pharmacologically innocuous and are used in amounts which are typically nontoxic.

The compositions of the present invention may also include certain preservatives to extend the shelf life of the compositions and to prevent deterioration thereof. The preservatives used in the subject compositions are commercially available and are selected so that they are compatible with the other components of the compositions and so that they will provide the desired hinderance against deterioration, particularly against deterioration of the color rendering capabilities of the dyes. Some of the preservatives which can be used in the subject disclosing compositions are propylene glycol, methyl and propyl parabens in a ratio of three parts of methyl to one part of propyl, sodium benzoate, benzoate citric acid preservative combinations and citric acid with color antiferments such as sodium benzoate solutions. Naturally, the preservative selected for use in any particular composition will be selected so that it is primarily capable of providing the desired degree of preservation for the dye used in such composition.

Each of the aforementioned components, namely the dyes, the taste masking agent, the sweetener and the preservative are mixed in a desired amount of water which is preferably a distilled, deionized or demineralized water to avoid insoluble salt formation. Thereafter, a suitable thickening agent such as a pharmacologically innocuous gelling agent is added to the composition in non-toxic amounts, but at least in an amount to provide the desired degree of consistency or viscosity. The amount of the gelling agent used in the subject compositions is sufficient to impart to the compositions a viscosity which prevents free flow as in the case of a liquid solution. However, the composition will be at least sufficiently thick to permit topical application and adherance to the dentin, restoration, or other parts of the oral cavity to which the composition is applied.

The disclosing compositions produced in accordance with the present invention and which use the components specified herein will generally have a pH within the range of approximately 6.0 to about 8.0. Normally the pH will be neutral but oftentimes may range approximately between 6.5 and 7.5. Nevertheless, the pH of the disclosing compositions should be approximately neutral. If for some reason the pH of the composition thus produced is too acidic or too basic, it is possible to add a needed amount of a suitable base such as sodium hydroxide (in the case of an excessively acid solution) or a needed amount of a suitable acid such as hydrochloric acid (in the case of an excessively basic solution) in order to bring the pH to a relatively neutral level.

There are a number of commercially available FDA approved pharmacologically innocuous gelling agents which are available for use in the subject disclosing compositions. The gelling agent selected for use in any of the compositions of the present invention must be substantially stable in the pH range of approximately 6.0 to approximately 8.0 and preferably in the pH range of approximately 6.5 to approximately 7.5. The pH of the gelled composition will be the same as that of the liquid solution prior to the addition of the gel. This gelling agent must also be compatible with the above described compositions and the various components therein and must comply with the various health codes and governmental regulations for use in medicaments of this type.

These available gelling agents which can be effectively used are compatible with the other components in the composition and include such gelling agents as sodium carboxymethyl cellulose, hydroxyethyl cellulose, hydroxypropyl cellulose, magnesium aluminum silicate and silica aerogel. Various combinations of gelling agents and activators such as polyvinyl alcohol and copolymers of maleic anhydride and methyl vinyl ether may also be effectively used as the gelling agent.

The gel compositions thus formed are at least partially non-Newtonian fluids and usually have thixotropic properties due to the reversible gel-sol-gel transition which occur in the gel form of the compositions. Accordingly, it is difficult to specify absolute viscosity ranges for these gel combinations measured in centipoises or other parameters which are consistently attainable by all or even many of the standard known techniques for measurement of viscosity. Normally, the viscosity of the gel compositions of the present invention is a function of the weight percent of the particular gelling agent employed. For the standard commercially available gelling agents which may be used in the compositions of the present invention, the gelling agent may constitute approximately 1.1 to approximately 1.45 percent by weight and preferably approximately 1.32 to about 1.42 percent by weight of the total composition. When the gelling agent is used in this specified range of approximately 1.10 to 1.45 percent by weight, the viscosity of the gelled compositions will normally be in the range of about 25,000 centipoises to about 150,000 centipoises and when used in preferred percentage, the viscosity will preferably be within the range of about 80,000 centipoises to about 130,000 centipoises as determined by the falling ball method to be hereinafter described. It may be desirable to produce compositions of different viscosity depending upon the intended method of use and therefore, the actual amount of gelling agent may be varied to provide a composition of the desired consistency. Thus, for example, if the gel is to be used in plastic applicators generally conforming to the arches of the oral cavity, so-called "gel trays" by a dentist, the compositions may be prepared with a slightly thicker consistency than if the compositions are to be applied by a spatula, swab or other instrument.

It is possible to determine the viscosity in centipoises within approximate ranges by employment of the particular falling ball viscosity measurement technique described herein. A number of viscosity measurements using the "falling ball method" of viscosity measurement were made on gel compositions produced in accordance with the present invention. It has also been established that the viscosity of the gel composition may vary slightly, even when measured by the same technique, depending on the method of making the gel compositions. The viscosity of the gel composition will be within the specified viscosity range when made in accordance with the present invention.

The falling ball method of viscosity measurement is a well known technique and operates on the principle that the particular liquid will exert a drag on a falling body in that liquid and this drag will vary in accordance with the viscosity of that liquid. A more detailed discussion of this method is provided in S. Glasstone, The Textbook of Physical Chemistry, D. Van Nostrand Co., 1946, 2nd Edition, Pages 498–499. Therefore, when specific viscosity ranges or specific viscosity measurements are referred to herein, it will be understood that these viscosity measurements were made according to the falling ball method of viscosity measurement which is described in detail below.

For the present viscosity measurement technique, five glass marble balls were used with known weights and diameter measurements which appear in Table 1 below.

TABLE 1

| Glass Marble Ball | Diameter (centimeters) | Weight (grams) | Density (grams cm³) |
|---|---|---|---|
| Red | 1.562 | 5.33911 | 2.6756 |
| Blue | 1.563 | 5.21113 | 2.6065 |
| Green | 1.565 | 5.25751 | 2.6196 |
| White | 1.547 | 5.11963 | 2.6510 |
| Yellow | 1.552 | 4.88722 | 2.4968 |
| Average | 1.558 | 5.16288 | 2.6079 |

A standard 100 milliliter laboratory glass graduated cylinder with a height of 10 inches was also employed. The cylinder had an outside diameter of 3 centimeters and an inside diameter of 2.5 to 2.6 centimeters with the 100 milliliter calibration mark approximately a distance of 19.8 centimeters from the outside bottom wall of the cylinder. The distance between the 10 milliliter incremental marks was approximately 1.86 centimeters. This type of graduated glass laboratory cylinder is commercially available from the Fisher Scientific Company as appearing in Fisher Catalog No. 70, Page 312.

All measurements to determine the viscosity in accordance with this falling ball method were conducted in solutions at room temperature of approximately 22° C. (70° F.) and at atmospheric pressure. The graduated cylinder was filled with a test solution having the composition specified in Example 1 herein, i.e., a composition containing 0.44 weight percent dye, 4.8 weight percent peppermint flavoring agent, 0.9 weight percent saccharin sweetener, 4.0 weight percent propylene glycol perservative, 1.4 weight percent high viscosity hydroxyethyl cellulose gelling agent, and 88.46 weight percent water. The composition was allowed to stand undistrubed for about ten minutes prior to any measurement in order to allow time for thixotropic recovery of apparent viscosity.

In order to conduct the viscosity measurements the first marble ball was dropped into the composition and when the bottom of the glass ball was even with the 90 milliliter graduation mark on the graduated cylinder, a stop watch was started. When the bottom of the glass ball was even with the 20 milliliter graduation mark on the cylinder, that is after the ball fell through 70 milliliters of composition, equivalent to a distance of 14.95 centimeters, the stop watch was stopped and the time for the ball to fall this distance was noted. After the first glass ball reached the bottom of the graduated cylinder, the composition was allowed to stand undisturbed for an additional 5 minutes, again in order to allow sufficient time for thixotropic recovery. Thereafter, the second glass ball was dropped into the composition and the time of the drop was measured over the 14.95 centimeter distance as described above for the first glass marble. The time noted for the third, fourth and fifth balls to fall through the 14.95 centimeter distance in the composition was also measured in the same way as the time for the first and second balls described above. However, the time for measurement with the third and fourth balls was conducted between the 100 milliliter and 30 milliliter graduation marks on the cylinder, a distance also equivalent to 14.95 centimeters.

It can be shown that for this system, the viscosity in terms of centipoises is given by the relation:

$$n = \frac{2 \, g r^2 \, (d' - d)}{q \, u}$$

where:

$n$ is the coefficient of viscosity in poises, $g$ is the gravitational acceleration (980.7 centimeter seconds $^{-2}$), $r$ is the radius of the falling balls (see Table 1), $d'$ is the density of the falling ball (as specified in Table 1)

$d$ is the density of the test composition, taken to be one gram centimeter $^{-3}$, $u$ is the velocity of the falling ball as it falls through the aforesaid preestablished distance in the test composition.

The time noted for each of the dropped balls to fall the 14.95 centimeter distance and the coefficient of viscosity thus determined is set forth in the following Table II:

TABLE II

| Glass Marble Ball | Time of Fall (minutes) | Coefficient of Viscosity (poises) |
|---|---|---|
| Red | 1.357 | 1213 |
| Blue | 1.350 | 1159 |
| Green | 1.348 | 1169 |
| White | 1.382 | 1187 |
| Yellow | 1.573 | 1240 |

The mean average coefficient of viscosity was calculated to be 1194 ± 33 (one standard deviation). With the constant values specified and with the determinations made, substitution into the above equation yeilds a final apparent viscosity of 1194 ± 33 poises as stated or 119,400 ± 3300 centipoises.

The "apparent viscosity" of a thixotropic fluid refers to the value obtained for such a fluid, which is by definition non-Newtonian, by measurement as aforesaid, assuming the fluid to be Newtonian. These values for viscosity as set forth herein are meaningful and reproducable when viscosity measurements are conducted as specified in accordance with the falling ball method described above. The falling ball method described herein can also be utilized to determine real or actual viscosity of a Newtonian fluid. Accordingly, the term apparent viscosity as used herein will also include such real or actual viscosities as determined by the falling ball method specified herein on Newtonian fluids. Therefore, when viscosity or apparent viscosity is referred to in the specification or in the claims in terms of poises or centipoises, such viscosity will be deemed to have been determined by the falling ball method as defined herein.

In the measurement of the gel compositions of the present invention by the falling ball method, as stated above, it was found that the gels should have at least a minimum viscosity of approximately 25,000 centipoises and a maximum viscosity of approximately 150,000 centipoises, and preferably a viscosity within the range of approximately 30,000 centipoises to approximately 80,000 centipoises.

When tested, the compositions of the present invention, when made with any of the aforementioned dyes, have been found to be highly effective in selectively staining plaque formation in the oral cavity even though the dye is incorporated in a rather viscous solution. Furthermore, it has been shown that the dyes will not unduly stain other portions of the oral cavity, since the dye is selectively releasable from the gel composition to the plaque contained in the oral cavity. It has been found that the selective staining will occur almost immediately after entering the oral cavity which is quite surprising since the dye is incorporated in the relatively thick and viscous gel composition. It has also been demonstrated that the taste masking agents and the sweeteners are effective in masking the normally unpalatable taste of the dyes even in these relatively viscous solutions which would normally not be expected.

As stated above, the various components are pharmacologically innocuous and are present in non-toxic amounts. The amount of dye present will vary according to the type of dye selected for use in the compositions of the present invention. For the most effective results the dye is present in an operative range in an amount from about 0.1 percent to about 12 percent by weight, though with certain dyes, the amount of dye present may be as high as 19 percent by weight with respect to the total weight of the composition. However, when the FD&C Red No. 3 dye is used as described above, this dye is preferably present in an operative range of about 0.2 percent to about 1.0 percent by weight with respect to the weight of the total composition. The amount of taste masking or flavoring agents used in the subject compositions will in large measure depend upon the type of and amount of dye which is used and in most cases the taste masking agent will be within an operative range of about 2.0 percent to about 20 percent by weight with respect to the total weight of the composition.

The sweetener is added to the composition in an amount to lend a desirably sweet taste to the composition and will vary depending on the types and amounts of dye and the types and amounts of taste masking agents which are used in the subject compositions. In most cases the sweetener will normally be present in an operative range of about 0.1 percent to about 4.0 percent by weight with respect to the total weight of the composition. The preservatives may be added to the compositions in combination and the amount of the preservative or the components of a preservative combination present will also vary in accordance with the type and amount of dye selected for use, and the type of preservative or preservative combinations to be used. In most cases the preservative or preservative combinations will normally be present in an operative range of about 0.02 percent to about 13 percent by weight with respect to the total weight of the composition.

The amount of gelling agent used will depend upon the type selected for use, and the desired viscosity which is to be imparted to the compositions of the present invention as aforesaid. As stated above, the gelling agent will preferably be present in an operative range of about 1.1 percent to about 1.45 percent by weight with respect to the total weight of the composition. Again, the amount of gelling agent used will in large measure depend upon the type of agent which is to be incorporated in the compositions. The amount of water present will account for the remaining weight of the composition, the water primarily acting as a carrier for the other components in the subject compositions.

The disclosing compositions of the present invention are preferably made by first producing a dye solution comprised of the organic dye, the flavoring agent, the sweetener and the preservatives selected for use in the compositions. In order to produce these dye solutions, a desired amount of the normally solid organic dye is added to an excess of deionized, demineralized or distilled water in a container or vessel formed of a relatively inert material such as a plastic vessel or a stainless steel vessel. Generally, the vessel and even the mixer used or other impliments which might contact the dye solution cannot be made of aluminum, galvonized iron or tin. Thereafter, the desired amounts of the selected flavoring agent, sweetner and preservatives are added to the dye-water solution and mixed until all components are completely disolved in the excess of water. In some cases the organic dyes have relatively low water solubilities and are hard to disolve, and therefore, the procedure used in the making of the dye solution may vary depending on the particular dye selected for use.

After the dye solution has been prepared, this solution is added to a desired amount of deionized, demineralized or distilled water in either a plastic or stainless steel vessel, though a plastic vessel is preferred. The water should preferably be preheated to about 180° F. to obtain better disolving action, although it is possible to use water at temperatures higher or lower than 180° F., and even room temperature for that matter, except that disolving of the components will take much longer. The dye solution is then mixed with additional amounts of water for a period of about five minutes. The selected gelling agent is then slowly added to the above mixture with constant stirring while maintaining the temperature of this mixture at about 180° F. A rotary agitator of the type often referred to as a "Lightning mixer" and having a double bladed propeller powered by a one-third horsepower motor is used for the mixing. While it is possible to use other forms of mixing devices such as a planetary mixer or a Waring blender type mixer, it has been found in connection with the present invention that the Lightning mixer is the most effective and preferred form. Again, any portion of the mixer which contacts the solution such as the shaft and the propeller blades is preferably stainless steel in order to avoid the formation of any insoluable precipitating salts.

The angle of the shaft driven by the mixer is initially maintained at about 8° with respect to the vertical centerline of the mixing vessel and enters the liquid mixture at the vortex created by the mixing action. The gelling agent is slowly added over about a ten minute period at the upper edge of the vortex so that it is pulled into the center of the vortex and centrifugally dispersed radially into the solution. During the adding of the gelling agent, the angle of the shaft holding the propeller blades is generally held to about 8° as aforesaid. After all of the gelling agent has been added, mixing will continue for about an additional 50 minutes to insure complete mixing and dissolving of the gelling agent, though this time may vary somewhat depending on the mixing environment and the type of mixer used.

After all of the gelling agent has been added, the viscosity of the mixture will begin to increase as the gelling agent is chemically incorporated into the mixture. As the viscosity increases, the angle of the shaft holding the propeller blades is slowly changed from about 8° to about 20° with respect to the vertical centerline of the vessel in order to keep the vortex at an optimum. However, even the angle of entry will vary in accordance with the type of mixer which is used. It is important to add the gelling agent very slowly and evenly inasmuch as these agents are very hydrophylic and will form lumps which are surface wetted with dry powder inside of the lumps if this precaution is not taken.

The invention is further illustrated by, but not limited to the following examples.

EXAMPLE 1

A plaque disclosing composition in gel form is prepared by introducing 50 pounds of a previously prepared dye solution to 150 pounds of a deionized water in a plastic vessel. The water is preheated to about 180° F. prior to the introduction of the dye solution. The resulting liquid mixture is then mixed for about two to three minutes using a double bladed propeller Lightning mixer with a one-third horsepower motor until all of the components are thoroughly dissolved.

The previously prepared dye solution is made by adding 1.1 pounds of a dye chemically known as a disodium salt of 9-o-carboxyphenyl-6-hydroxy-2,4,5,7-tetraiodo-3-isoxanthone along with approximately 10 pounds of an aqueous solution of peppermint flavoring, about 1.9 pounds of a solid saccharin sweetner and about 6 pounds of a propylene glycol preservative to approximately 31 pounds of deionized water in a plastic vessel and thoroughly mixed until all components are dissolved. The final solution has an approximate weight percent composition of 2.2% dye, 20% peppermint, 3.8% sacchrin, and 12% propylene glycol preservative. The pH of this prepared dye solution is about 6.9. The final dye solution is then filtered using a filter pump prior to use in disclosing composition.

After the dye solution is thoroughly mixed with the deionized water, 2.8 pounds of a high viscosity hydroxyethyl cellulose gelling agent sold under the tradename "Natrosol" is slowly added to the liquid mixture while maintaining the temperature of this mixture at about 180° F. and thoroughly mixing with the Lightning mixer. The angle of the shaft holding the propeller blades is initially maintained about 8° with respect to the vertical centerline of the vessel and enters the liquid mixture at the vortex created by the mixing action. This mixing is continued for about 20 minutes with the blade rotating at about 1,725 revolutions per minute during which time the gelling agent is slowly added to the upper edge of the vortex so that it is pulled into the center of the vortex and centrifugally dispersed radially into the solution. During the adding of the gelling agent, the angle of the shaft holding the propeller blades is slowly changed from about 8° to about 20° with respect to the vertical centerline of the vessel. After all of the gelling agent has been added, the mixing action is continued for about ten additional minutes until all of the introduced gelling agent has been thoroughly dissolved.

The resultant gel composition is then removed from the vessel and tested for composition, pH and viscosity. The composition is found to have a pH of about 6.9 and an apparent viscosity of about 119,400 centipoises as determined by the falling ball method described above. In addition the various components are found to be present in the composition in the listed approximate percentages by weight:

| Component | Percentage by Weight |
| --- | --- |
| dye | 0.55 |
| flavoring agent | 5.00 |
| sweetener | 0.95 |
| preservative | 3.00 |
| gelling agent | 1.40 |
| water | 89.10 |

The plaque disclosing composition is found to be highly effective in selectively staining plaque formation in the oral cavity of human beings through topical application to the teeth. The composition is applied by means of a plastic tray designed to fit around selected portions of both the upper and the lower arches. Thereafter, the excess of the composition is removed by rinsing with tap water and the dye which is absorbed is not removed by this oral rinsing. Furthermore, the dye is found to clearly distinguish plaque formation from the remaining portions of the oral cavity. In addition, the composition is found to have a rather pleasing taste to the user thereof. No tissue damage or other adverse conditions are noted as a result of the application of the disclosing composition.

EXAMPLE 2

Example 1 is repeated except that the gelling agent used is sodium carboxymethyl cellulose and this gelling agent is added in the same manner as used in example 1 in the same amount, namely 2.8 pounds. No pH change is observed in the resulting composition and this composition is found to have an apparent viscosity of about 119,400 centipoises as determined by the falling ball method described above.

The various components are found to be present in the composition in the following listed approximate percentages by weight:

| Component | Percentage by Weight |
| --- | --- |
| dye | 0.55 |
| flavoring agent | 5.00 |
| sweetener | 0.95 |
| preservative | 3.00 |
| gelling agent | 1.40 |
| water | 89.10 |

The resultant plaque disclosing composition is applied to the teeth in the oral cavity of human beings through topical application in the manner described above, and is also found to be very effective in selectively staining plaque formation. The dye is also found to clearly distinguish the plaque formation from the remaining portions of the oral cavity and the composition similarity is found to have a pleasing taste to the user thereof. In like manner, no tissue damage or other adverse conditions are noted as a result of the application of the disclosing composition.

EXAMPLE 3

Example 1 is repeated except that 2.7 pounds of the hydroxyethyl cellulose gelling agent is added in the same manner as in example 1. The resulting composition is found to have the same pH of 6.9 and an apparent viscosity of about 90,000 centipoises as determined by the falling ball method described above.

The various components are found to be present in the composition in the following listed approximate percentages by weight:

| Component | Percentage by Weight |
| --- | --- |
| dye | 0.55 |
| flavoring agent | 5.00 |
| sweetener | 0.95 |
| preservative | 3.00 |
| gelling agent | 1.35 |
| water | 89.15 |

The resultant plaque disclosing composition is applied to the dentin in the oral cavity of human beings through topical application in the manner described above, and is also found to be very effective in selectively staining plaque formation. However, the viscosity of the composition is less than that of the composition of example 1 but is still sufficiently thick to enable topical application to the teeth in the oral cavity. The dye is similarly effective in clearly distinguishing the plaque formation from the remaining portions of the oral cavity and the pleasing taste to the user thereof is not otherwise altered. In like manner, no tissue damage or other adverse conditions are noted as a result of the application of the disclosing composition.

EXAMPLE 4

Example 1 is repeated except that 2.84 pounds of the hydroxyethyl cellulose gelling agent used is added in the same manner as in Example 1. The resulting composition is, again, found to have the same pH of 6.9 and an apparent viscosity of about 135,000 centipoises as determined by the falling ball method described above.

The various components are found to be present in the composition in the following listed approximate percentages by weight:

| Component | Percentage by Weight |
| --- | --- |
| dye | 0.55 |
| flavoring agent | 5.00 |
| sweetener | 0.95 |
| preservative | 3.00 |
| gelling agent | 1.42 |
| water | 89.08 |

The resultant plaque disclosing composition is applied to the dentin in the oral cavity of human beings through topical application in the manner described above, and is also found to be very effective in selectively staining plaque formation. The viscosity of the composition is somewhat greater than the viscosity of the composition in Example 1. Nevertheless the composition is still sufficiently flowable to enable topical application to the teeth in the oral cavity.

EXAMPLE 5

Example 1 is repeated except that the gelling agent used in sodium carboxymethyl cellulose and 2.2 pounds of this gelling agent is added in the same manner as in example 1. The resultant composition has an apparent viscosity of about 25,000 centipoises as determined by the falling ball method.

The approximate percent by weight of the components in the resultant composition is:

| Component | Percentage by Weight |
| --- | --- |
| dye | 0.55 |
| flavoring agent | 5.00 |
| sweetener | 0.95 |
| preservative | 3.00 |
| gelling agent | 1.06 |
| water | 89.40 |

This composition is not found to be effective in that it is not sufficiently viscous and accordingly too flowable to to topically applied to the teeth in the oral cavity. Due to the lack of sufficient thickness, the composition would run and stain other portions of the oral cavity.

EXAMPLE 6

Example 1 is repeated except that the gelling agent used is sodium carboxymethyl cellulose and 3.0 pounds of this gelling agent is added in the same manner as in example 1. The resultant composition has an apparent viscosity of about 200,000 centipoises as determined by the falling ball method.

The approximate percent by weight of the components in the resultant composition is:

| Component | Percentage by Weight |
| --- | --- |
| dye | 0.55 |
| flavoring agent | 5.00 |
| sweetener | 0.95 |
| preservative | 3.00 |
| gelling agent | 1.50 |
| water | 89.00 |

This composition is not found to be effective in that it is too viscous and accordingly not sufficiently flowable to be topically applied to the teeth in the oral cavity. Due to the thickness of the composition, difficulty is encountered in applying the composition to the teeth.

EXAMPLE 7

A plaque disclosing composition in gel form in prepared by introducing 50 pounds of a previously prepared dye solution to 150 pounds of a deionized water in a plastic vessel. The water is preheated to about 180°F. prior to the introduction of the dye solution. The resulting liquid mixture is then mixed for about two to three minutes using a double bladed propeller Lightning mixer with a one-third horsepower motor until all of the components are thoroughly dissolved.

The previously prepared dye solution is made by adding 0.7 pounds of a dye chemically known as a disodium salt of 9-o-carboxyphenyl-6-hydroxy-2,4,5,7-tetraiodo-3-isoxanthone, along with approximately 7.86 pounds of an aqueous solution of peppermint flavoring, about 1.44 pounds of a solid saccharin sweetner and about 6.4 pounds of a propylene glycol preservative to approximately 33.60 pounds of deionized water in a plastic vessel and thoroughly mixing until all components are dissolved. The final solution has an approximate weight percent composition of 1.4% dye, 15.7% peppermint, 2.87% saccharin, and 12.8% propylene glycol preservative. The pH of the solution is normal at about 7.0. Furthermore, the final dye solution is filtered prior to use in the composition, the filtration taking place in conjunction with the use of a filter pump.

After the dye solution is thoroughly mixed with the deionized water, 2.72 pounds of sodium carboxymethyl cellulose gelling agent is slowly added to the liquid mixture while maintaining the temperature of this mixture at about 180°F. and thoroughly mixing with the Lightning mixer. The angle of the shaft holding the propeller blades is initially maintained about 8° with respect to the vertical centerline of the vessel and enters the liquid mixture at the vortex created by the mixing action. This mixing is continued for about twenty minutes with the blade rotating at about 1,725 revolutions per minute during which time the gelling agent is slowly added to the upper edge of the vortex so that it is pulled into the center of the vortex and centrifugally dispersed radially into the solution. During the adding of the gelling agent, the angle of the shaft holding the propeller blades is slowly changed from about 8° to about 20° with respect to the vertical centerline of the vessel. After all of the gelling agent has been added, the mixing action is continued for about ten additional minutes until all of the introduced gelling agent has been thoroughly dissolved.

The resultant gel composition is then removed from the vessel and tested for composition, pH and viscosity. The composition is found to have a pH of about 7.0 and an apparent viscosity of about 110,000 centipoises as determined by the falling ball method described above. In addition, the various components are found to be present in the composition in the listed percentages by weight:

| Components | Percentage by Weight |
| --- | --- |
| dye | 0.35 |
| flavoring agent | 3.93 |
| sweetener | 0.72 |
| preservative | 3.20 |
| gelling agent | 1.36 |
| water | 90.44 |

The plaque disclosing composition described above is found to be very effective in selectively staining plaque formation in the oral cavity of human beings through topical application to the teeth. The composition is applied to the teeth on both the upper and the lower arches by means of a spatula. Thereafter, the excess of the composition is removed by rinsing with tap water and the dye which is absorbed by the dentin is not removed by this oral rinsing.

The amount of dye incorporated in the composition of this example 7 is less than the amount incorporated in the composition of example 1, accordingly, the composition has to be held in contact for a slightly longer period of time to obtain substantially the same staining effect. However, the dye in this composition is, nevertheless, found to clearly distinguish plaque formation from the remaining portions of the oral cavity. The amount of gelling agent added is slightly less than that added to the composition of Example 1 and, accordingly, the composition has a slightly lower viscosity. Nevertheless, the viscosity is sufficiently high so that the composition functions very effectively for topical application. In addition, the composition is found to have the same pleasing taste to the user thereof and does not produce any tissue damage or other adverse conditions.

EXAMPLE 8

Example 7 is repeated except that the gelling agent used is hydroxyethyl cellulose and 2.84 pounds of this gelling agent is added in the same manner as used in example 7. The resulting composition is found to have the same pH of 7.0 and a viscosity of about 123,000 centipoises as determined by the falling ball method described above.

The dye solution thus prepared is found to have an approximate weight percent composition of 4.8% dye, 15.7% peppermint, 2.8% saccharin, 12.8% propylene glycol preservative and 63.9% water.

The various components are found to be present in the final disclosing composition in the following listed approximate percentages by weight:

| Component | Percentage by Weight |
| --- | --- |
| dye | 1.20 |
| flavoring agent | 3.93 |
| sweetener | 0.72 |
| preservative | 3.20 |
| gelling agent | 1.42 |
| water | 89.53 |

Both the viscosity and the dye content was somewhat higher than in the composition of example 7. The higher viscosity does not affect topical application since the composition is still sufficiently freely flowable. The resultant plaque disclosing composition is also found to be very effective in selectively staining plaque formation in the oral cavity. The dye is also found to clearly distinguish the plaque formation from the remaining portions of the oral cavity and the composition similarity is found to have a pleasing taste to the user thereof. In similar manner, no adverse conditions are noted as a result of the application of this particular disclosing composition.

EXAMPLE 9

This example discloses the effectiveness of dental disclosing compositions using the dye included in the compositions of examples 1 and 7 with different amounts of the other active ingredients. This plaque disclosing composition is prepared in gel form by introducing 50 pounds of a previously prepared dye solution to 150 pounds of deionized water in a plastic vessel preheated to about 180°F. The resulting liquid mixture is then mixed for about 2 to 3 minutes with the double bladed propeller Lightning mixer having the one-third horsepower motor until all of the components are thoroughly dissolved.

The previously prepared dye solution is made by adding 4.6 pounds of the disodium salt of 9-o-carboxyphenyl-6-hydroxy-2,4,5,7-tetraiodo-3-isoxanthone along with approximately 17 pounds of an aqueous solution of a clove extract flavoring, about 4.40 pounds of a sucrose sweetener ang about 10 pounds of a preservative to approximately 12 pounds of deionized water in a plastic vessel and thoroughly mixed until all components are dissolved. The preservative combination used in a diluted combination of methyl and ethyl parabens with approximately three parts of methyl paraben to one part of ethyl paraben. The final solution has an approximate weight percent composition of 9.2% dye, 34% flavoring agent, 8.8% sucrose and 20% preservative. The pH of this prepared dye solution is about 7.2. The final dye solution is then filtered using a filter pump prior to use in disclosing composition.

After the dye solution is thoroughly mixed with the deionized water, 2.8 pounds of a high viscosity hydroxyethyl cellulose gelling agent sold under the tradename Natrosol is slowly added to the liquid mixture while maintaining the temperature of this mixture at about 180° F. and thoroughly mixed with the Lightning mixer. The gelling agent is added in the same manner as the gelling agent is added to the liquid solution specified in examples 1 and 7 and mixing is conducted in the same manner and for approximately the same time periods.

The resultant gel composition is then removed from the plastic vessel and tested for composition, pH and viscosity. The composition is found to have a pH of about 7.2 and an apparent viscosity of about 119,400 centipoises as determined by the falling ball method described above. In addition the various components are found to be present in the composition in the listed approximate percentages by weight:

| Component | Percentage by Weight |
|---|---|
| dye | 2.30 |
| flavoring agent | 8.50 |
| sweetener | 2.20 |
| preservative | 5.00 |
| gelling agent | 1.40 |
| water | 80.60 |

This plaque disclosing composition is also found to be very effective is selectively staining plaque formation in the oral cavity through topical application to the teeth and again no adverse conditions are noted. The composition contains a substantial amount of dye which readily pronounces the plaque formation and which also clearly distinguishes the plaque formation from the remaining portions of the oral cavity.

EXAMPLE 10

Example 9 is repeated except that the gelling agent used is sodium carboxymethyl cellulose and this gelling agent is added in the same manner as used in example 1 but in an amount of about 2.70 pounds. No pH change is observed in the resulting composition but this composition is found to have an apparent viscosity of about 85,000 centipoises as determined by the falling ball method described above. Approximately 8.90 pounds of a clove oil flavoring agent is used in place of the clove extract flavoring agent. Furthermore, about 2.44 pounds of a saccharin sweetener is used in place of the sucrose sweetener. Finally, 8.0 pounds of a benzoate citric acid preservative combination is used in place of the methyl and ethyl paraben combination preservative.

The various components are found to be present in the composition in the following listed approximate percentages by weight:

| Component | Percentage by Weight |
|---|---|
| dye | 1.35 |
| flavoring agent | 4.45 |
| sweetener | 1.22 |
| preservative | 4.00 |
| gelling agent | 1.35 |
| water | 87.63 |

The resultant plaque disclosing composition is applied to the teeth in the oral cavity of human beings through topical application in the manner described above. This composition is similarly found to effectively stain plaque formation and clearly distinguishes the plaque formation from the remaining portions of the oral cavity. No tissue damage or other adverse conditions are noted as a result of the application of this disclosing composition.

EXAMPLE 11

Example 9 is repeated except that 2.7 pounds of the hydroxyethyl cellulose gelling agent is added in the same manner as in example 1. The resulting composition is found to have the same pH of 7.2 and an apparent viscosity of about 130,000 centipoises as determined by the falling ball method described above.

The various components are found to be present in the composition in the following listed approximate percentages by weight:

| Component | Percentage by Weight |
|---|---|
| dye | 1.35 |
| flavoring agent | 4.45 |
| sweetener | 1.22 |
| preservative | 4.00 |
| gelling agent | 1.42 |
| water | 87.56 |

The resultant plaque disclosing composition is applied to the dentin in the oral cavity of human beings through topical application in the manner described above, and is also found to be very effective in selectively staining plaque formation. However, the viscosity of the composition is greater than that of the composition of example 9 but is still sufficiently fluid to enable topical application to the teeth in the oral cavity.

EXAMPLE 12

This example described a disclosing composition similar to the composition described in example 1 except that a different dye is used. This plaque disclosing composition is prepared in gel form by introducing 50 pounds of deionized water in a plastic vessel. The water is preheated to about 180° F. prior to the introduction of the dye solution. The resulting liquid mixture is then mixed for about 2 to 3 minutes using a double bladed propeller Lightning mixer with a one-third horsepower motor until all of the components are thoroughly dissolved.

The previously prepared dye solution is made by adding 7.60 pounds of a dye to be hereinafter described along with approximately 10 pounds of an aqueous solution of peppermint flavoring, about 1.9 pounds of a solid saccharin sweetener and about 6 pounds of a propylene glycol preservative to approximately 24.50 pounds of deionized water in a plastic vessel and thoroughly mixing until all components are dissolved. The dye selected for use is 4{[4-(N-ethyl-p-sulfobenzylamino)-phenyl]-(2-sulfoniumphenyl) -methylene} -[1-(N-ethyl-N-p-sulfobenzyl)-Δ 2.5-cyclohexadienimine] which is commercially known as FD&C Blue No. 1. The final solution has an approximate weight percent composition of 15.2% dye, 20% peppermint, 3.8% saccharin, and 12% propylene glycol preservative. The final dye solution is filtered using a filter pump prior to incorporation into the composition. The pH of the solution is adjusted by adding a slight amount of hydrochloric acid to bring the pH to 7.0.

After the dye solution is thoroughly mixed with the deionized water, 2.8 pounds of a high viscosity sodium hydroxyethyl cellulose gelling agent is slowly added to the liquid mixture while maintaining the temperature of this mixture at about 180° F. and thoroughly mixed with the Lightning mixer. This gelling agent is often sold under the tradename Natrosol and is commercially available. The angle of the shaft holding the propeller blades is initially maintained about 8° with respect to the vertical centerline of the vessel and enters the liquid mixture at the vortex created by the mixing action. This mixing is continued for about 20 minutes with the blade rotating at about 1,725 revolutions per minute during which time the gelling agent is slowly added to the upper edge of the vortex so that it is pulled into the center of the vortex and centrifugally dispersed radially into the solution. During the adding of the gelling agent, the angle of the shaft holding the propeller blades is slowly changed from about 8° to about 20° with respect to the vertical centerline of the vessel. After all of the gelling agent has been added, the mixing action is continued for about 10 additional minutes until all of the introduced gelling agent has been thoroughly dissolved.

The resultant gel composition is then removed from the vessel and tested for composition, pH and viscosity. The composition is found to have a pH of about 7.0 and an apparent viscosity of about 119,400 centipoises as determined by the falling ball method described above. In addition the various components are found to be present in the composition in the listed approximate percentages by weight:

| Component | Percentage by Weight |
|---|---|
| dye | 3.80 |
| flavoring agent | 5.00 |
| sweetener | 0.95 |
| preservative | 3.00 |
| gelling agent | 1.40 |
| water | 85.85 |

The plaque disclosing composition described above is found to be effective in selectively staining plaque formation in the oral cavity of human beings through topical application to the teeth. The composition is applied to the teeth on both the upper and lower arches by means of a spatula. Thereafter, the excess of the composition is removed by rinsing with tap water and the dye which is absorbed by the plaque is not removed by this oral rinsing. While the dye used in this composition is not as effective in readily distinguishing the plaque formation as the dye used in the compositions of examples 1 and 7, the dye is nevertheless found to distinguish plaque formation from the remaining portions of the oral cavity. In addition the composition is found to have a rather pleasing taste to the user thereof. No tissue damage or other adverse conditions are noted as a result of the application of the disclosing composition.

EXAMPLE 13

Example 12 is repeated except that the gelling agent used is sodium carboxylmethyl cellulose and about 2.70 pounds of this gelling agent is added in the same manner as used in example 12. The resulting composition is found to have the same pH of about 7.0 after addition of the hydrochloric acid and a viscosity of about 90,000 centipoises as determined by the falling ball method described above.

The various components are found to be present in the composition in the following listed approximate percentages by weight:

| Component | Percentage by Weight |
|---|---|
| dye | 3.80 |
| flavoring agent | 5.00 |
| sweetener | 0.95 |
| preservative | 3.00 |
| gelling agent | 1.35 |
| water | 85.90 |

The resultant plaque disclosing composition is applied to the teeth in the oral cavity of human beings through topical application in the manner described above. This composition is also found to be as effective as the composition of example 12 in selectively staining plaque formation and in distinguishing the plaque formation from the remaining portions of the oral cavity. No tissue damage or other adverse conditions are noted as a result of the application of the disclosing composition.

EXAMPLE 14

Example 12 is repeated except that the gelling agent used is sodium carboxymethyl cellulose and 2.9 pounds of this gelling agent is added in the same manner as used in example 12. The resulting composition is found to have the same pH of 7.0 and a viscosity of about 123,000 centipoises as determined by the falling ball method described above. In addition, about 2.4 pounds of the same FD&C Blue No. 1 dye is used in the preparation of the dye solution which is used to produce the final disclosing composition.

The various components are found to be present in the final disclosing composition in the following listed approximate percentages by weight:

| Component | Percentage by Weight |
|---|---|
| dye | 1.20 |
| flavoring agent | 5.00 |
| sweetener | 0.95 |
| preservative | 3.00 |
| gelling agent | 1.42 |
| water | 88.43 |

The resultant plaque disclosing composition is applied to the teeth in the oral cavity of human beings in any of the manners described above. The dye is also found to distinguish the plaque formation from the remaining portions of the oral cavity though the amount of the dye used is slightly less than that needed to be very effective for this particular dye composition. The composition is similarly found to have a pleasing taste to the user thereof. No adverse conditions are noted as a result of the application of the disclosing composition.

EXAMPLE 15

This example describes a disclosing composition similar to the compositions of examples 7 or 12 except that yet another dye is used and which is present in a large amount. This plaque disclosing composition is prepared in gel form by introducing 50 pounds of a previously preparaed dye solution to 150 pounds of deionized water in a plastic vessel. The water is preheated to about 180° F. prior to the introduction of the dye solution. The resulting liquid mixture is then mixed for about 2 to 3 minutes using a double bladed propeller Lightning mixer with a one-third horsepower motor until all of the components are thoroughly dissolved.

The previously prepared dye solution is made by adding 8.26 pounds of a dye to be hereinafter described along with approximately 7.86 pounds of an aqueous solution of peppermint flavoring, about 1.44 pounds of a solid saccharin sweetener and about 6.4 pounds of a propylene glycol preservative to approximately 28.04 pounds of deionized water in a plastic vessel and thoroughly mixed until all components are dissolved. The dye selected for use is the monosodium salt of 4{[4-(N-ethyl-p-sulfobenzylamino)-phenyl]-[4-(N-ethyl-p-sulfoniumbenzylamino)-phenyl]-methylene}-(N,N-dimethyl-$\Delta^{2,5}$-cyclohexadienimine) and which is often commercially known as FD&C Violet No. 1. The final solution has an approximate weight percent composition of 12.52% dye, 15.7% peppermint, 2.87% saccharin, and 12.8% propylene glycol preservative. The pH of the solution is adjusted by adding a slight amount of hydrochloric acid to bring the pH to about 7.0. The solution is then filtered with the aid of a filter pump.

After the dye solution is thoroughly mixed with the deionized water, 2.72 pounds of sodium carboxymethyl cellulose gelling agent is slowly added to the light mixture while maintaining the temperature of this mixture at about 180° F. and thoroughly mixed with the Lightning mixer. The angle of the shaft holding the propeller blades is initially maintained about 8° with respect to the vertical centerline of the vessel and enters the liquid mixture at the vortex created by the mixing action. This mixing is continued for about 20 minutes with the blade rotating at about 1,725 revolutions per minute during which time the gelling agent is slowly added to the upper edge of the vortex so that it is pulled into the center of the vortex and centrifugally dispersed radially into the solution. During the adding of the gelling agent, that angle of the shaft holding the propeller blades is slowly changed from about 8° to about 20° with respect to the vertical centerline of the vessel. After all of the gelling agent has been added, the mixing action is continued for about 10 additional minutes until all of the introduced gelling agent has been thoroughly dissolved.

The resultant gel composition is then removed from the vessel and tested for composition, pH and viscosity. The composition is found to have a pH of about 7.0 and a viscosity of about 110,000 centipoises as determined by the falling ball method described above. In addition the various components are found to be present in the composition in the listed approximate percentages by weight:

| Component | Percentage by Weight |
| --- | --- |
| dye | 3.13 |
| flavoring agent | 3.93 |
| sweetener | 0.72 |
| preservative | 3.20 |
| gelling agent | 1.36 |
| water | 87.66 |

The plaque disclosing composition described above is found to be about as effective as the composition of example 12 in selectively staining plaque formation in the oral cavity of human beings through topical application to the teeth for clearly distinguishing this plaque from the remaining portions of the oral cavity. The composition is applied by the means described in example 7 and the excess of the composition is thereafter removed by rinsing with tap water. The composition is also found to have a rather pleasing taste to the user thereof. No adverse conditions such as tissue damage are noted as a result of the application of the disclosing composition.

EXAMPLE 16

Example 15 is repeated except that 2.84 pounds of the hydroxyethyl cellulose gelling agent is added in the same manner as in example 15. The resulting composition is again found to have the same pH of 7.0 after addition of the hydrochloric acid and an apparent viscosity of about 135,000 centipoises as determined by the falling ball method described above. The dye used in example 15 is also added in an amount of about 11 pounds to make the dye solution.

The various components are found to be present in the composition in the following listed approximate percentages by weight:

| Component | Percentage by Weight |
| --- | --- |
| dye | 5.50 |
| flavoring agent | 3.93 |
| sweetener | 0.72 |
| preservative | 3.20 |
| gelling agent | 1.43 |
| water | 85.22 |

The resultant plaque disclosing composition is applied to the teeth in the oral cavity of human beings through topical application in the manner described above. This composition is also found to be as effective as the compositions of examples 12 or 15 in selectively staining plaque formation, and in distinguishing the plaque formation from the remaining portions of the oral cavity. The viscosity of the composition is somewhat greater than the viscosity of the composition in example 15. Nevertheless, the composition is still sufficiently flowable to enable topical application to the teeth in the oral cavity.

EXAMPLE 17

This example describes a disclosing composition similar to the compositions of examples 7, 12 or 15 except that another phenyl substituted 4-(N-ethyl-p-sulfobenzylamino)-$\Delta$-cyclohexadienimine dye is used. This plaque disclosing composition in gel form is prepared by introducing 50 pounds of a previously prepared dye solution to 150 pounds of deionized water in a plastic vessel. The water is preheated to about 180° F. prior to the introduction of the dye solution. The resulting liquid mixture is then mixed for about 2 to 3 minutes using a double bladed propeller Lightning mixer with a one-third horsepower motor until all of the components are thoroughly dissolved.

The previously prepared dye solution is made by adding about 5.88 pounds of the dye to be hereinafter described along with approximately 7.86 pounds of an aqueous solution of peppermint flavoring, about 1.44 pounds of a solid saccharin sweetener and about 6.4 pounds of a propylene glycol preservative to approximately 28.42 pounds of deionized water in a plastic vessel and thoroughly mixing until all components are dissolved. The dye selected for use in the monosodium salt of 4-[4-(N-ethyl-p-sulfobenzylamino)-diphenylmethylene]-[1-(N-ethyl-N-P-sulfoniumbenzyl)-$\Delta^{2,5}$-cyclohexadienimine] and which is often commercially known as FD&C Green No. 1. The final solution has an approximate weight percent composition of 11.76% dye, 15.7% peppermint, 2.87% saccharin, and 12,8% propylene glycol preservative. The pH of the solution is adjusted to be normal at about 7.0 by adding a slight amount of hydrochloric acid to the dye solution. Thereafter, the dye solution is filtered prior to use in the making of the disclosing composition.

After the dye solution is thoroughly mixed with the deionized water, 2.72 pounds of high viscosity hydroxyethyl cellulose gelling agent is slowly added to the liquid mixture while maintaining the temperature of this mixture at about 180° F. and thoroughly mixed with the Lightning mixer. The angle of the shaft holding the propeller blades is initially maintained about 8° with respect to the vertical centerline of the vessel and enters the liquid mixture at the vortex created by the mixing action. This mixing is continued for about 20 minutes with the blade rotating at about 1,725 revolutions per minute during which time the gelling agent is slowly added to the upper edge of the vortex so that it is pulled into the center of the vortex and centrifugally dispersed radially into the solution. During the adding of the gelling agent, the angle of the shaft holding the propeller blades is slowly changed from about 8° to about 20° with respect to the vertical centerline of the vessel. After all of the gelling agent has been added, the mixing action is continued for about 10 additional minutes until all of the introduced gelling agent has been thoroughly dissolved.

The resultant gel composition is then removed from the vessel and tested for composition, pH and viscosity. The composition is found to have a pH of about 7.0 and an apparent viscosity of about 110,000 centipoises as determined by the falling ball method described above. In addition the various components are found to be present in the composition in the listed approximate percentages by weight:

| Component | Percentage by Weight |
|---|---|
| dye | 2.94 |
| flavoring agent | 3.93 |
| sweetener | 0.72 |
| preservative | 3.20 |
| gelling agent | 1.36 |
| water | 87.85 |

The plaque disclosing composition described above is found to be about as effective as the composition of examples 12 or 15 in selectively staining plaque formation in the oral cavity of human beings through topical application to the teeth for distinguishing the plaque formation from the remainder of the oral cavity. The composition is applied by means of a plastic tray designed to fit around selected portions of both the upper and the lower arches or by means of a spatula. Thereafter, the excess of the composition is removed by rinsing with tap water and the dye which is absorbed by the plaque is not removed by this oral rinsing. In addition, the composition is found to have the same rather pleasing taste to the user thereof. No tissue damage or other adverse conditions are noted as a result of the application of the disclosing composition.

EXAMPLE 18

Example 17 is repeated except that the gelling agent used is hydroxyethyl cellulose and 2.80 pounds of this gelling agent is added in the same manner as used in example 17. About 8.90 pounds of a clove oil flavoring agent is used in place of the peppermint flavoring agent. About 2.44 pounds of a sucrose sweetener is used in place of the saccharin. Also about 8.0 pounds of a benzoate citric acid preservative is used in place of the propylene glycol preservative. The resulting composition is found to have a pH about 7.0 and with the addition of a suitable amount of hydrochloric acid, the pH is reduced to the normal pH of 7.0. The composition is also found to have an apparent viscosity of about 119,400 centipoises as determined by the falling ball method described above.

The various components are found to be present in the composition in the following listed approximate percentages by weight:

| Components | Percentage by Weight |
|---|---|
| dye | 2.94 |
| flavoring agent | 4.45 |
| sweetener | 1.22 |
| preservative | 4.00 |
| gelling agent | 1.40 |
| water | 85.99 |

The resultant plaque disclosing composition is applied to the teeth in the oral cavity of human beings through topical application in the manner described above. The composition is also found to be as effective as the composition of example 17 in selectively staining plaque formation and distinguishing the plaque formation from the remaining portions of the oral cavity. As in the case of the previous compositions, no tissue damage or other adverse conditions are noted as a result of the application of this disclosing composition.

EXAMPLE 19

This example describes another composition of the present invention using a different type of phenyl substituted -cyclohexadienimine dye. This particular plaque disclosing composition in gel form is prepared by introducing 50 pounds of a previously prepared dye solution to 50 pounds of deionized water in a plastic vessel. The water is preheated to about 180° F. prior to the introduction of the dye solution. The resulting liquid mixture is then mixed for about two to three minutes using a double bladed propeller Lightning mixer with a one-third horsepower motor until all of the components are thoroughly dissolved.

The previously prepared dye solution is made by adding approximately 2.82 pounds of a dye of the aforesaid type which is described in more detail below, along with approximately 7.22 pounds of an aqueous solution of a clove extract flavoring, approximately 5.6 pounds of a solid saccharin sweetener and about 18 pounds of a methyl and ethyl paraben preservative of the type used in the composition of example 9 to approximately 16.36 pounds of deionized water in a plastic vessel and thoroughly mixing until all components are dissolved. The dye selected for use in the composition of this example is the disodium salt of 4- [4-(N-ethyl-p-sulfobenzylamino)-phenyl]-(4-sulfonium-phenyl)-methylene -[1-(N-ethyl-N-p-sulfobenzyl)-$\Delta^{2,5}$-cyclohexadienimine] and which is often commercially known and available as FD&C Green No. 2. The final solution has an approximate weight percent composition of 5.64% dye, 14.44% clove extract, 11.2% sacchrin, and 36% of the methyl and ethyl preservative combination. The pH of the solution which is found to be higher than normal pH is reduced by addition of a slight amount of hydrochloric acid to bring the pH to 7.0. The dye solution is then filtered prior to incorporation into the composition in the manner as described in the previous examples.

After the dye solution is thoroughly mixed with the deionized water, about 2.9 pounds of sodium carboxymethyl cellulose gelling agent is slowly added to the liquid mixture while maintaining the temperature of this mixture at about 180° F. and thoroughly mixed with the Lightning mixer. The mixer is operated at the same speed as specified in example 17 and the angle of the shaft holding the propeller blades is shifted with respect to the vertical centerline of the vessel during the addition of the gelling agent in the same manner as stated in example 17. The mixing action is continued until all of the introduced gelling agent has been thoroughly dissolved.

The resultant gel composition is then removed from the vessel and tested for composition, pH and viscosity. The composition is found to have a pH of about 7.0 and an apparent viscosity of about 123,000 centipoises as determined by the falling ball method described above. In addition the various components are found to be present in the composition in the listed approximate percentages by weight:

| Component | Percentage by Weight |
| --- | --- |
| dye | 1.41 |
| flavoring agent | 3.61 |
| sweetener | 2.80 |
| preservative | 9.00 |
| gelling agent | 1.43 |
| water | 81.75 |

The plaque disclosing composition is found to be as effective as the composition of example 17 in selectively staining plaque formation in the oral cavity of human beings through topical application to the teeth. The composition is applied by means of a plastic tray or a spatula in the manner as previously described. Thereafter, the excess of the composition is removed by rinsing with tap water and the dye which is absorbed by the plaque is not removed by this oral rinsing, to thererby distinguish plaque formation from the remaining portions of the oral cavity. No tissue damage or other adverse conditions are noted as a result of the application of the disclosing composition.

EXAMPLE 20

Example 19 is repeated except that the gelling agent used is hydroxyethyl cellulose and about 2.6 pounds of this gelling agent is added in the same manner as used in example 19. In addition, only 2.48 pounds of the dye specified in example 19 is used in the composition of this example 20. The resulting composition is found to have the same pH of 7.0 after addition of a proper amount of the neutralizing hydrochloric acid, and an apparent viscosity of about 70,000 centipoises as determined by the falling ball method described above.

The various components are found to be present in the composition in the following listed approximate percentages by weight:

| Component | Percentage by Weight |
| --- | --- |
| dye | 1.24 |
| flavoring agent | 3.61 |
| sweetener | 2.80 |
| preservative | 9.00 |
| gelling agent | 1.30 |
| water | 82.05 |

The resultant plaque disclosing composition is applied to the teeth in the oral cavity of human beings through topical application in the manner described above. This composition has a lower viscosity than the composition of example 19 and the composition is somewhat flowable, but nevertheless sufficiently thick for effective topical application. The dye content in the composition of this example is less than the content of the dye specified in the composition of example 19. However, the composition is also found to be about as effective as the composition of example 18 in selectively staining plaque formation and distinguishing the plaque formation from the remaining portions of the oral cavity. The composition similarly is found to have a pleasing taste to the user thereof. In like manner, no adverse conditions such as tissue damage or the like can be observed as a result of the application of the disclosing composition.

EXAMPLE 21

This example describes a further composition of the present invention which employs yet another dye compound in the preparation of the composition. The plaque disclosing composition of the example is prepared in gel form by introducing 50 pounds of a previously prepared dye solution to 150 pounds of deionized water in a plastic vessel. The water is preheated to about 180° F. prior to the introduction of the dye solution. The resulting liquid mixture is then mixed for about 2 to 3 minutes using the same Lightning mixer with the one-third horsepower motor until all of the components are thoroughly dissolved.

The previously prepared dye solution is made by adding approximately 2.82 pounds of a dye, the chemical composition of which is hereinafter described, along with approximately 5.12 pounds of an aqueous solution of peppermint flavoring, about 4.9 pounds of a solid saccharin sweetner and about 7.5 pounds of a propylene glycol preservative to approximately 29.66 pounds of deionized water in a plastic vessel and thoroughly mixing until all components are dissolved. The dye compound selected for use in the making of this dye solution and the ultimate disclosing composition is chemically known as the disodium salt of 4- [4-(N-ethyl-p-sulfobenzylamino)-phenyl]-(4-hydroxy-2-sulfoniumphenyl)-methylene -[1-(N-ethyl-N-p-sulfobenzyl)-$\Delta^{2,5}$-cyclohexadienimine] and which is commercially known and available as FD&C Green No. 3. The final solution has an approximate weight percent composition of 5.64% dye, 10.24% peppermint flavoring, 9.8% saccharin, and 15% propylene glycol preservative. The pH of the solution is again found to be higher than normal when tested with a pH meter and is adjusted to 7.0 by adding a slight amount of hydrochloric acid to the solution. Prior to use in the making of the composition, the finally prepared dye solution is filtered with the aid of a filter pump.

After the dye solution is thoroughly mixed with the deionized water, about 2.76 pounds of hydroxyethyl cellulose gelling agent is slowly added to the liquid mixture while maintaining the temperature of this mixture at about 180° F. and thoroughly mixing with the Lightning mixer. The mixing procedure is the same as that described in example 15 and is therefore not described in further detail in connection with this example. After all of the gelling agent has been added, the mixing action is continued until all of the introduced gelling agent has been thoroughly dissolved.

The resultant gel composition is then removed from the vessel and tested for composition, pH and viscosity. The composition is found to have a pH of about 7.0 and an apparent viscosity of about 100,000 centipoises as determined by the falling ball method described above. In addition the various components are found to be present in the composition in the listed approximate percentages by weight:

| Component | Percentage by Weight |
| --- | --- |
| dye | 1.41 |
| flavoring agent | 2.56 |
| sweetener | 2.45 |
| preservative | 3.75 |
| gelling agent | 1.38 |
| water | 88.45 |

The plaque disclosing composition is found to be as effective as the compositions described in examples 12, 15, 17 and 19 in selectively staining plaque formation in the oral cavity of human beings through topical application to the teeth. The composition is again applied by means of a plastic tray designed to fit around selected portions of both the upper and the lower arches. Thereafter, the excess of the composition is removed by rinsing with tap water and the dye which is absorbed by the plaque formation is not removed by this oral rinsing so that the dye distinguishes plaque formation from the remaining portions of the oral cavity. In addition the composition is found to have a rather pleasing taste to the use thereof. No tissue damage or other adverse conditions are noted as a result of the application of the disclosing composition.

EXAMPLE 22

Example 21 is repeated except that the gelling agent used is a silica aerogel and 2.64 pounds of this gelling agent is added in the same manner as used in example 21. The resulting composition is found to have a pH of 7.0 after addition of the hydrochloric acid and an apparent viscosity of about 75,000 centipoises as determined by the falling ball method described above. The dye used in the composition of example 21 is also used in the composition of this example but is only added in an amount of about 1.98 pounds.

The various components are found to be present in the composition in the following listed approximate percentages by weight:

| Component | Percentage by Weight |
| --- | --- |
| dye | .89 |
| flavoring agent | 2.56 |
| sweetener | 2.45 |
| preservative | 3.75 |
| gelling agent | 1.32 |
| water | 89.03 |

The resultant plaque disclosing composition is applied to the teeth in the oral cavity of human beings through topical application in the manner described above, and is also found to be as effective in selectively staining plaque formation as the composition of example 21. The composition similarly is found to have a pleasing taste to the user thereof. In like manner, no adverse conditions are noted as a result of the application of the disclosing composition.

EXAMPLE 23

Example 21 is repeated except that the gelling agent used is sodium carboxymethyl cellulose and 2.8 pounds of this gelling agent is added in the same manner as used in example 21. The resulting composition is thereupon found to have an apparent viscosity of about 119,400 centipoises as determined by the falling ball method described above. The dye is used in the same amount, though 15 pounds of an aqueous solution of a clove extract is used in place of the peppermint flavoring. About 6.44 pounds of a sucrose sweetener is used in place of the saccharin sweetener. Furthermore, the preservative used is citric acid with a sodium benzoate color antiferment, and this preservative is used in the amount of about 6.92 pounds.

The various components are found to be present in this composition in the following listed approximate percentages by weight:

| Component | Percentage by Weight |
| --- | --- |
| dye | 1.41 |
| flavoring agent | 7.50 |
| sweetener | 3.22 |
| preservative | 3.46 |
| gelling agent | 1.4 |
| water | 83.01 |

The resultant plaque disclosing composition is applied to the teeth in the oral cavity of human beings through topical application in the manner described above. This composition is found to be effective in selectively staining plaque formation to thereby distinguish the plaque formation from the remaining portions of the oral cavity. As in the case of the composition described in previous examples, no tissue damage or other adverse conditions are noted as a result of the application of this disclosing composition.

Thus there has been described a unique and novel dental disclosing composition which is easily applied to the teeth in a human oral cavity for selectively staining any plaque formation therein and which does not present any adverse conditions to the user thereof, and thereby fulfills all of the objects and advantages sought therefor. It should be understood that changes and modifications including the substitution, elimination or addition of various components can be made in the subject disclosing compositions, or the method of making such compositions, or the method of using such compositions, without departing from the nature and principle of the invention. Therefore, all such changes and modifications which do not depart from the nature and principle of the invention are deemed to be covered by the invention which is limited only by the following claims.

Having thus described our invention, what we desire to claim and secure by Letters Patent is:

1. A method of making a dye containing gel composition for use in visibly disclosing plaque formation in an oral cavity, said method comprising adding to water a pharmacologically innocuous taste masking agent in an amount sufficient to provide a desirably sweet taste to said composition, a pharmacologically innocuous preservative present in an amount sufficient to prevent substantial deterioration of the dye, a pharmacologically innocuous organic dye compound selectively absorbable by plaque formation in an oral cavity upon release from the composition and being selected from the class consisting of (a) FD&C Red No. 3, (b) FD&C Blue No. 1, (c) FD&C Violet No. 1, (d) FD&C Green No. 1, (e) FD&C Green No. 2, and (f) FD&C Green No. 3, to thereby produce a liquid dye solution, heating said liquid dye solution, said dye being added to said dye solution in amounts sufficient to permit selective staining of plaque in the oral cavity so that the plaque is relatively visible to the naked eye under normal light conditions, mixing said liquid dye solution with a propeller mechanism entering into said solution in such manner so as to create a vortex approximately in the center of a vessel containing said solution, and simultaneously slowly adding a pharmacologically innocuous gelling agent to said solution along the edge of said vortex, said gelling agent being added in non-toxic amounts within a range of about 1.1 to about 1.45 percent by weight based on the total weight of the composition but at least in an amount sufficient to produce a desired apparent viscosity in said solution within the range of approximately 25,000 centipoises to approximately 150,000 centipoises as determined by the falling ball method, continuing the mixing with said propeller mechanism after all of the sufficient amount of the gelling agent has been added, adjusting the pH of said composition to within the range of approximately 6.0 to approximately 8.0, and periodically changing the angle of entry of said propeller mechanism in said solution to keep the vortex at an optimum until the desired viscosity of said gel composition has been achieved.

2. The method of making the gel composition of claim 1 wherein the dye solution is heated to approximately 180°F prior to the addition of the gelling agent.

3. The method of making the gel composition of claim 1 wherein the angle of entry of the propeller mechanism is periodically changed from about 8° to about 20° with respect to the vertical centerline of the vessel.

4. The method of making the gel composition of claim 1 wherein the components are mixed in a vessel which is chemically inert with respect to the components introduced therein.

5. The method of making the gel composition of claim 4 wherein the propeller mechanism is a rotary agitator.

6. The dye containing gel composition prepared by the method of claim 1.

7. A method for visualizing plaque formation in the oral cavity and rendering such plaque formation visually distinguishable by the naked eye from teeth and restorations in the oral cavity comprising applying the dye containing gel composition of claim 6 to the teeth and restorations and allowing absorption of the dye by the plaque, said dye having strong affinity for the plaque formation in the oral cavity to be quickly absorbable thereby, said gel being sufficiently thick to adhere to the dentine or restorations in the oral cavity, said method further comprising rinsing the oral cavity to remove the excess dye containing gel composition and with said dye being absorbable by the plaque formation such that it is not redissolved upon rinsing the composition from the oral cavity with water, but which becomes highly diluted and rinsed from the teeth and restorations in the oral cavity with an excess of water and without staining other portions of the oral cavity, whereby any plaque present in the oral cavity is readily visible to the naked eye.

8. The method of claim 7 wherein the dye in said composition is FD&C Red No. 3.

9. The method of claim 7 wherein said composition also comprises a pharmacologically innocuous flavoring agent present in said composition in non-toxic amounts but in an amount sufficient to effectively mask substantial portions of unpalatable taste arising from the dye.

* * * * *